United States Patent
Acharya et al.

(10) Patent No.: US 12,242,357 B2
(45) Date of Patent: Mar. 4, 2025

(54) BALANCING OF SLICES WITH CONSOLIDATION AND RE-SLICING

(71) Applicant: Dell Products L.P., Round Rock, TX (US)

(72) Inventors: Soumen Acharya, Bangalore (IN); Aaditya Rakesh Bansal, Bangalore (IN); Upanshu Singhal, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 56 days.

(21) Appl. No.: 17/660,773

(22) Filed: Apr. 26, 2022

(65) Prior Publication Data

US 2023/0342259 A1    Oct. 26, 2023

(51) Int. Cl.
| | |
|---|---|
| *G06F 16/30* | (2019.01) |
| *G06F 11/14* | (2006.01) |
| *H04L 67/1095* | (2022.01) |
| *H04L 67/1097* | (2022.01) |

(52) U.S. Cl.
CPC ...... *G06F 11/1464* (2013.01); *G06F 11/1451* (2013.01); *H04L 67/1095* (2013.01); *H04L 67/1097* (2013.01); *G06F 2201/84* (2013.01)

(58) Field of Classification Search
CPC ....................................................... G06F 16/30
See application file for complete search history.

(56) References Cited

U.S. PATENT DOCUMENTS

| | | | | |
|---|---|---|---|---|
| 2021/0318811 A1* | 10/2021 | Grube | ..................... | G06F 3/067 |
| 2022/0121528 A1* | 4/2022 | Brenner | ................. | G06F 3/0656 |
| 2023/0185504 A1* | 6/2023 | Zhang | ................... | G06F 3/1296 |
| | | | | 358/1.15 |

* cited by examiner

*Primary Examiner* — Khanh B Pham
(74) *Attorney, Agent, or Firm* — Workman Nydegger

(57) ABSTRACT

One example method includes, in a network attached storage platform, determining a size of a slice of data that is included in a share of the network attached storage platform, when the size of the slice exceeds a threshold, re-slicing the slice to generate multiple new slices, and each of the new slices has a size that is smaller than the threshold, and when all slices in the share have been evaluated in terms of their respective sizes, generating a slice list that includes the new slices.

19 Claims, 13 Drawing Sheets

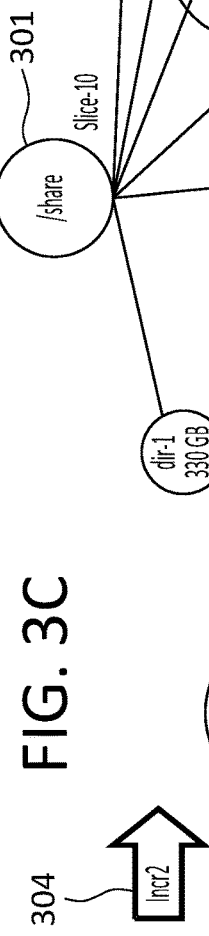
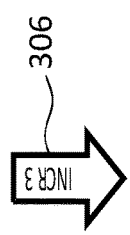
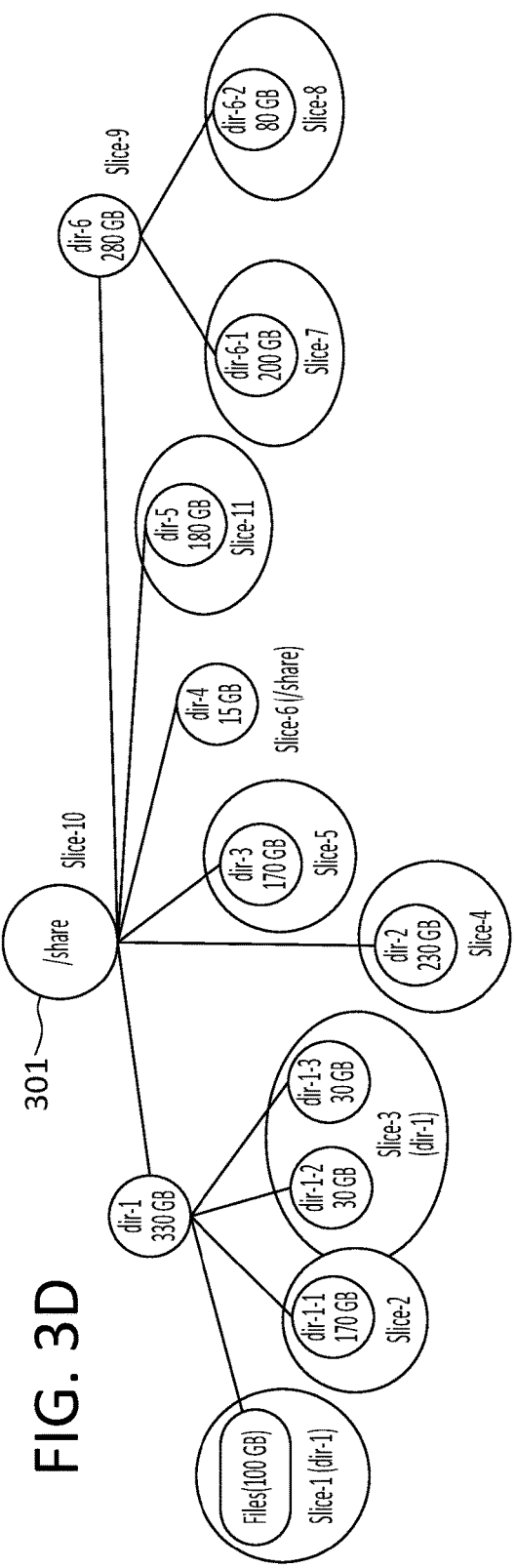
FIG. 3C
FIG. 3D

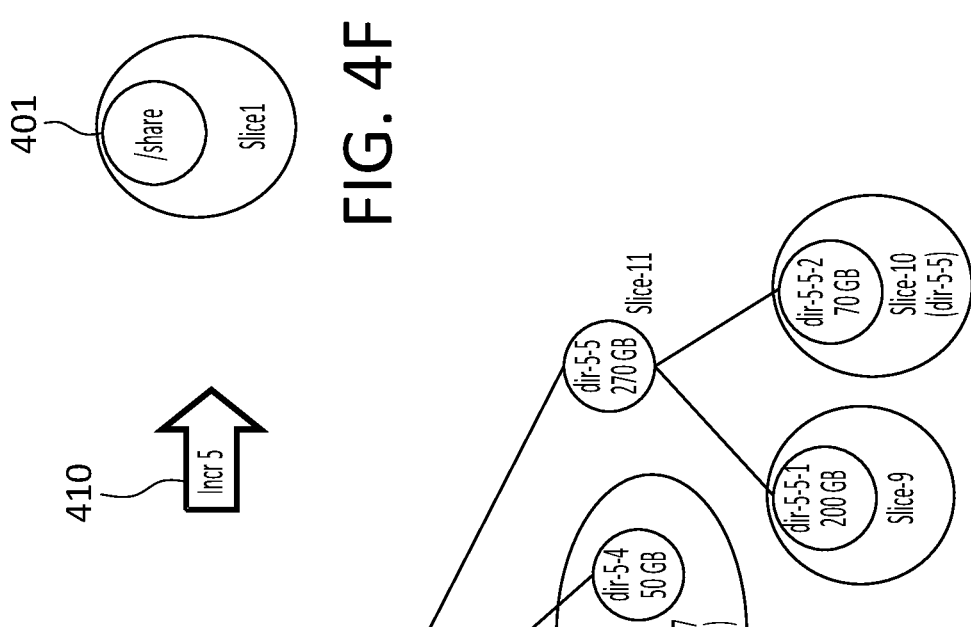
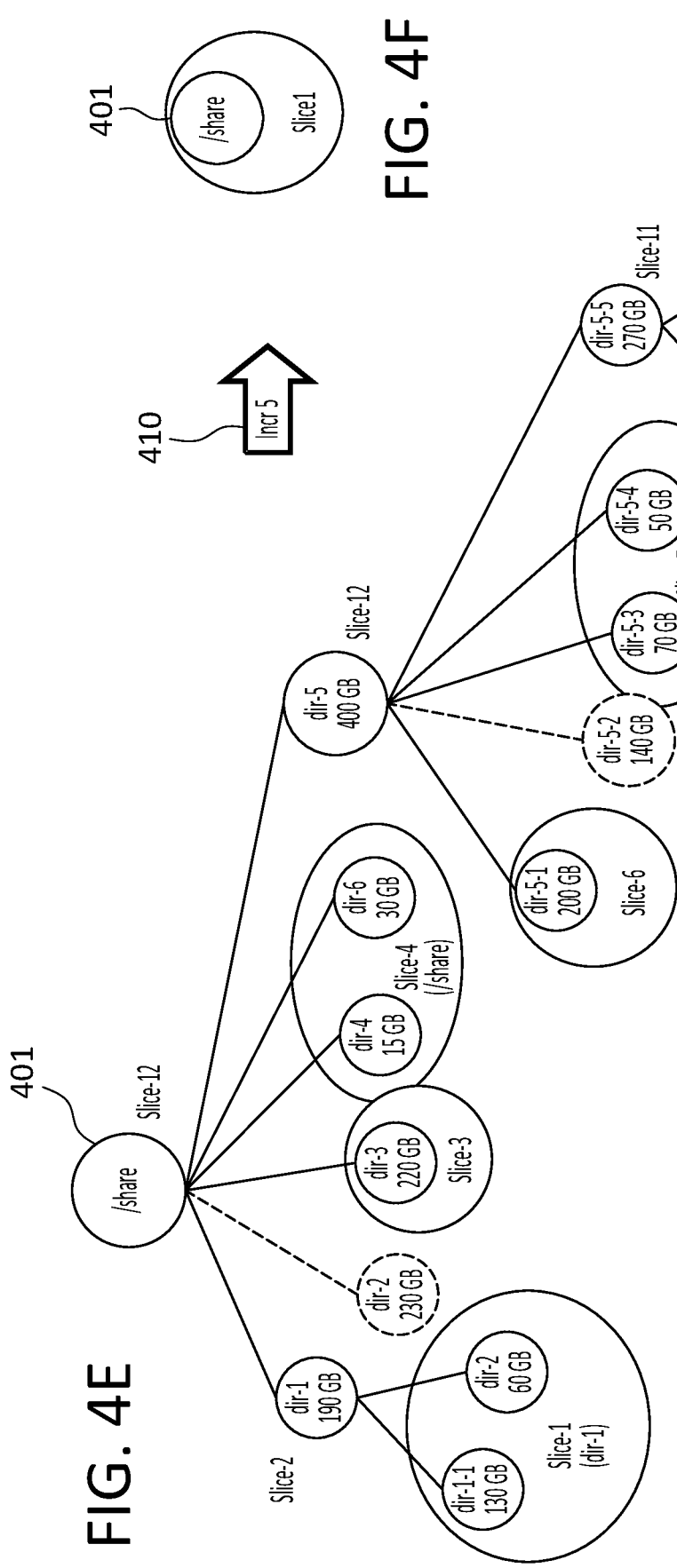
FIG. 4E
FIG. 4F

Delete Directories

BALANCING OF SLICES WITH CONSOLIDATION AND RE-SLICING

FIELD OF THE INVENTION

Embodiments of the present invention generally relate to data protection. More particularly, at least some embodiments of the invention relate to systems, hardware, software, computer-readable media, and methods for managing data of an NAS (network attached storage) to improve backup performance.

BACKGROUND

Network attached storage systems and devices, which may serve as dedicated file storage, are commonly used due to their convenience, scalability, and data storage capacity. In terms of convenience, multiple clients can share an NAS system, the NAS may be continuously available to the clients, and the NAS may function as a private cloud serving a group of clients within an enterprise. As well, an NAS may have a large data capacity and, as such, is readily scalable to suit client needs. Each client may have its own 'share' of the NAS that is dedicated to storage of the date of that client.

However, the relatively large storage capacity of a typical NAS, while useful to clients, may introduce problems where backups are concerned. For example, it may be quite time-consuming, and resource-intensive, to back up one or more shares of an NAS. More specifically, typical NAS platforms are not configured to support multiple backup streams, so that the NAS share(s) must be backed up using a single stream, which results in a slow backup process.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIGS. 3a-3d disclose various example processes involving one or more slices.

FIGS. 4a-4f disclose further example processes involving one or more slices.

DETAILED DESCRIPTION OF SOME EXAMPLE EMBODIMENTS

Figure 1:
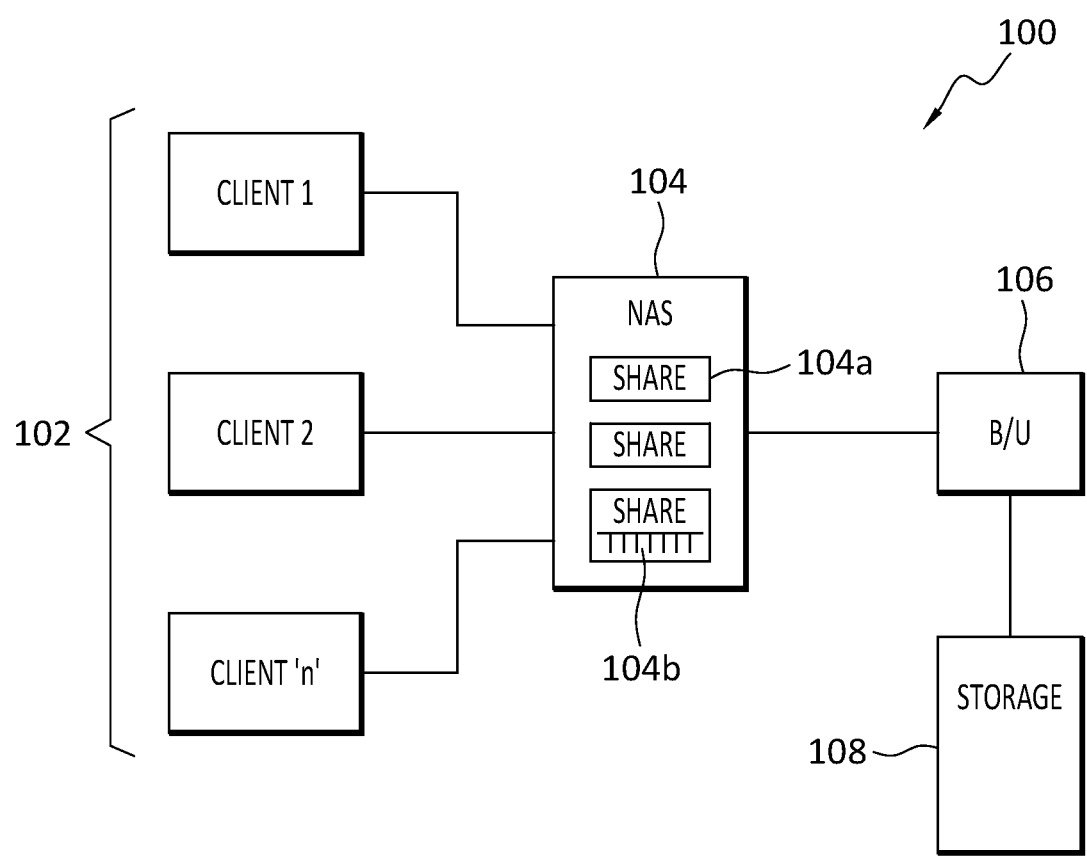
FIG. 1 discloses an example operating environment for some embodiments.

Embodiments of the present invention generally relate to data protection. More particularly, at least some embodiments of the invention relate to systems, hardware, software, computer-readable media, and methods for managing data of an NAS (network attached storage) to improve backup performance.

In general, example embodiments of the invention may operate to slice a dataset in a storage system, such as an NAS share, into one or more slices. The slices may be independent of each other, that is, the data in a slice is not dependent upon, nor is depended upon by, data in any other slice. Each of the slices may be sized in terms of the maximum number of files, or file count, to be included in the slice and/or in terms of the maximum amount of data, measured in GB for example, to be included in the slice. The file count may be in the millions, for example, and data thresholds may be expressed as a percentage, and both file counts and data thresholds may be user specified.

The slices of an NAS share may be reevaluated from time to time, such as when data has been added/deleted to/from the NAS share. Based on the reevaluation, one or more slices may be defined, such as due to an increase in NAS data in one or more existing slices, and/or multiple slices may be consolidated, such as due to a decrease in NAS data included in those slices, into a smaller number of slices, such as one slice for example. Further, one or more existing slices may be re-sliced. These addition/consolidation/re-slice processes may be implemented based on file counts in the slice(s) and/or based on an amount of data in the slice(s) involved. Note that the addition/deletion of one or more slices does not change the amount of data stored at the NAS but, rather, provides a way to group the NAS data so as to facilitate, for example, parallel stream backups of the data within an NAS share.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, embodiments may enable the use of parallel stream backups of data that is stored in a storage system such as an NAS. Embodiments may optimize, on an ongoing basis, the grouping of data within one or more portions, or shares, of a storage system such as an NAS. Embodiments may improve the speed with which data backups are performed, relative to the speed of conventional approaches that do not employ such embodiments. Various other advantages of example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of an Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention may operate in connection with data protection platforms, examples of which include the Dell-EMC NetWorker and Avamar platforms and associated backup software, and Dell-EMC PowerProtect Data Manager (PPDM) data protection environment, and storage environments such Dell-EMC PowerProtect DataDomain (DD). In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

With particular attention now to FIG. 1, one example of an operating environment for embodiments of the invention is denoted generally at 100. In general, the operating environment 100 may comprise any number 'n' clients 102 that may operate to generate new/modified data, and which may also operate to delete data. The clients 102 may store their respective data in respective shares at an NAS (network attached storage) 104 platform or device.

From time to time, a backup platform 106 may back up the data defined as being included within the slices of a share of the NAS 104. The NAS 104 may have any number of shares 104a, and one or more of the shares 104a may be sliced and re-sliced to define any number of slices 104b. The backup platform 106 may be configured to use multiple parallel streams to backup the slices, where each stream may correspond to respective slice. In this way, multiple slices may be backed up using parallel backup streams, that is, the backups of the slices may overlap in time with each other. After the backup platform 106 has created respective backups of one or more of the slices, the backups may be retrievably stored at a storage site 108, which may be on-premises, or in a cloud.

In some embodiments, each backup stream may back up a respective slice that is the same size as the other slices being backed up in parallel with respective backup streams. Note that in some embodiments, a backup may take the form of a snapshot of only data that has changed from one point in time to another point in time.

B. Introduction

In order to achieve scale and performance for any size of NAS share, example embodiments of the invention include systems, methods, and algorithms for an automatic slicing workflow in an NAS context. Briefly, embodiments may operate to create "slices" of a single NAS share, which may be referred to herein simply as a 'share,' and may operate to backup, or direct the backup of, those slices from one or multiple proxy hosts. These slices may be used for backup for Gen-0 backup of a dataset, that is, an initial full backup of the dataset, and one or more subsequent incremental backups of the dataset. Due to the continuous growth and changes in customer data, embodiments may operate to balance, or 're-slice,' an NAS share so that the share is backed up with the same, or improved, efficiency with which the share was backed up after an initial slicing of the share was performed. Following is some basic information concerning some example embodiments of the invention.

In general, various considerations may apply in one or more embodiments. These considerations are presented only by way of illustration and are not intended to limit the scope of the invention in any way. Additional, or alternative, considerations may also apply in some embodiments.

Consideration No. 1—A re-slicing operation may cater to elements within a single existing slice. In cross slice operations pertaining to re-slicing, consolidation would not be performed. Further, re-slice of one slice may not impact other slices in the same backup.

Consideration No. 2—Re-slicing parameters, based on which the share is to be sliced, may be configurable. Thus, for example, a slice with 400 GB of data (re-slicing parameter 1) and/or 2 million files (re-slicing parameter 2), may be a candidate for re-slicing, in some embodiments. Additional, or alternative, re-slicing parameters, and thresholds, may be used.

Consideration No. 3—The schedule according to which re-slicing is to be performed may be configurable, and modifiable. For example, re-slicing may be performed periodically according to a regular time, or event, schedule. Additionally, or alternatively, re-slicing may be performed on-demand by a user.

Consideration No. 4—The output of a slice/re-slice operation may be made available for analysis and performance considerations. For example, a user may ask for re-slicing, while omitting the performance of a backup operation, to validate the re-slicing.

C. Aspects of Some Example Embodiments

Following is a discussion of aspects of some example embodiments. These aspects and embodiments are provided by way of illustration, and are not intended to limit the scope of the invention in any way.

C.1 Re-Slicing Mechanisms and Parameters

In some example embodiments, every slice of an NAS share may be defined as having a maximum of 200 GB of data and/or a maximum of 1 million files, although different maximum thresholds for either/both of data and file count may be employed. One or more slices may each have only a single folder, or one or more slices may contain multiple folders. No particular slice configuration is required however. The same slice(s) may be used for the initial backup of a dataset, which may be referred to herein as the 'Gen-0' backup, and for any subsequent backup(s) of that dataset. Embodiments of the invention may thus account for, and accommodate, growth in the folders and files that make up a slice.

By way of illustration, consider an example slice of 200 GB and/or 1 million files, with a daily change rate of 3%, that is, the amount of the data in the slice increases by 3% each day. With this example change rate, a 200 GB slice may grow in size to ~400 GB with in a month, or, a 1 million file slice may grow in size to ~2 million files in that same time period. Note that data amounts may grow even more quickly, or more slowly, than in these examples. To illustrate, 200 GB may grow to 400 GB in 15 days, or only after 40 days. Taking the foregoing as illustrative, embodiments may perform the re-slicing of a slice when that slice reaches certain threshold values such as, for example, 400 GB and/or 2 million files. The data size and/or file count may be user-specified values, and are not limited to the foregoing examples. Some embodiments may employ additional, or alternative, threshold values as a basis for triggering, possibly automatically, a re-slicing process. Following is a description of an example of a method according to some embodiments.

C.2 Method for Re-Slicing

Figure 2:
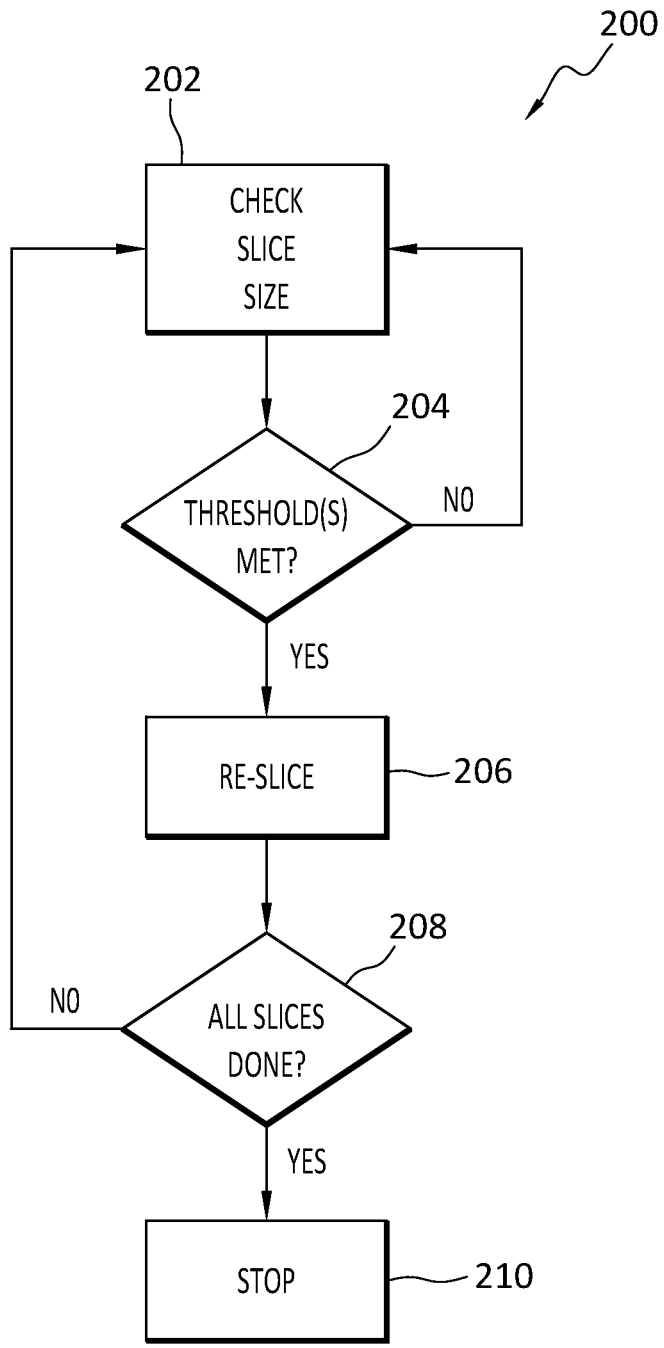
FIG. 2 discloses an example slicing method according to some embodiments.

With attention now to FIG. 2, an example method 200 is disclosed. The method 200 may begin when a slice/next slice is checked 202. This check 202 may be performed before performance of an incremental backup. The slice size check 202 may be performed as part of a SnapshotAndSlice operation, and the check 202 may be performed by looking at a backup history in SQLite (database engine) meta-data file. The backup history may indicate what the slice size was as of the time of the last incremental backup.

If it is determined at 204 that the slice does not meet or exceed the threshold(s) applicable to that slice, the method 200 may return to 202. In some embodiments, this next check may not be performed until after another incremental backup of the slice has been performed. On the other hand, if it is determined 204 that the slice meets or exceeds the threshold(s) applicable to that slice, such as 400 GB and/or 2 million Files, for example, the method 200 may advance to 206. At 206, the slice may be re-sliced into multiple new slices. Particularly, the operation 206 may involve performing a crawl, such as by way of a depth first search (DFS) to the slice, and then re-slicing the slice into new slices, each of which may be no larger than 200 GB and/or 1 million files.

Note that a slice may not be evenly divisible into 200 GB/1 million file, or threshold-sized, slices and, as such, a slice may be created—during a re-slicing process—that is below, possibly significantly below, the applicable threshold(s). For example, a 300 GB slice may be re-sliced to create a 200 GB slice and a 100 GB slice. As another example, a 300 GB slice may be re-sliced to create two 150 GB slices, or a 125 GB slice and a 175 GB slice, for example.

With continued reference to FIG. 2, the method 200 may, after the res-slicing 206 has been performed, check 208 to determine if all slices have been checked, and re-sliced if necessary. If not, the method 200 may return to 202. When it has been determined 208 that all the slices have been checked, and re-sliced if necessary, the method 200 may then 210 generate a new slice list that includes the newly created slices, and the method 200 may then stop.

Note that a variation of the method 200 may be employed to implement slice consolidations. For example, if it is determined at 204 that two or more slices are below an applicable threshold, those slices may be consolidated together to form a new slice. The new slice formed by consolidation may be included in the new slice list generated at 210. Further details concerning some example slice consolidations, and slice consolidation operations, are disclosed elsewhere herein.

Methods according to example embodiments, including the method 200 and its variations, may provide various advantages. For example, re-slicing may be performed only for limited number of slices, and not the entire share that includes those slices. As another example, the slices may be re-balanced, by re-slicing, to achieve the same, or optimal, backup efficiency as provided by the initial slicing that was performed on the dataset. An embodiment may generate an equal number of slices across multiple proxy hosts, and the number of slices may be the same as were generated in the initial slicing of the dataset(s) in the share(s). As a final example, by keeping slices at or below one or more thresholds, embodiments may provide for container size management with respect to container size considerations in storage environments, such as the DellEMC DataDomain (DD) platform.

C.3 NAS Agent and Filesystem Agent Implementations

In example embodiments, an NAS System and NAS Backup environment may host an NAS Agent that may operate to re-organize the slice(s) and create a new slice list for backup. Thus, an NAS agent according to some embodiments may perform slice, re-slice, and slice consolidation, operations with regard to slices of one or more shares residing at the NAS. As well, an NAS Agent may update an input JSON (JavaScript Object Notation) for a Filesystem Agent with new slicing information after a slice, re-slice, or slice consolidation, operation has been performed. As used herein, a JSON refers to an " . . . an open standard file format and data interchange format that uses human-readable text to store and transmit data objects consisting of attribute-value pairs and arrays (or other serializable values). It is a common data format with diverse uses in electronic data interchange, including that of web applications with server . . . " (see, e.g., https://en.wikipedia.org/wiki/JSON).

With regard to the Filesystem Agent (FSA) implementation, the NAS Agent may need to send SSIDs (SaveSet IDs) of the previous CDSF (Common Data Streaming Format) backup containers. The FSA may refer to the SSID of a previous backup for any new slices that are created. Next, new containers for the slices, and a new SQLite meta-data file may be generated that lists the new slices. Finally, new SSIDs may be generated for the CDSF and the new SQLite meta-data file.

In more detail, the CDSF is a container format which may comprise all the data rolled over during a backup iteration. To illustrate, suppose that the system is taking a backup of a single NAS asset which breaks into 10 slices. At the end of the backup, the remote storage will contain 10 files (that is, CDSF containers), each file/container comprising the data that constitutes the corresponding slice.

Note that as used herein, SSID refers to 'Savset ID.' Briefly, the SSID is a serial number of each container of a slice which was backed up. Taking the above example, when the backup is complete, the metadata of that backup may store a number, such as 10 for example, of Serial IDs (SSIDs), one associated with each slice for future incremental backups or recovery operations. When an incremental backup is performed, reference may be made to the previous backup so as to backup only the data that has changed since that previous backup. Since the system may actually be backing up in terms of pseudo assets, that is, slices, embodiments may refer to the SSID of the containers of previous backup slices for this purpose.

C.4 Re-Slicing Scheduling

Re-Slicing may be performed periodically, such as every week or every month, for example. The methods disclosed herein may be used for re-slicing and may overcome the challenges of increase of backup window time. In some embodiments, re-slicing every week may be a default option that may be overridden by a customer through a configuration parameter. Further, the re-slicing period may be set on asset level, PLC level, or any other level. This approach may provide the advantage of re-slicing the slices as they reach a threshold of ~400 GB/~2 million files, or other thresholds.

D. Aspects of Example Re-Slicing, Addition, and Consolidation, Cases

With attention now to FIGS. 3a-7b, details are provided concerning some example re-slicing and slice consolidation cases. These Figures are for the purpose of illustrating various concepts according to some example embodiments and are not intended to limit the scope of the invention in any way.

D.1 FIGS. 3a-3d

Turning first to FIGS. 3a-3d, examples of various slice operations are disclosed. These example slice operations include addition of a new slice, re-slicing of an existing slice, and consolidation of multiple slices. In the examples of FIGS. 3a-3d, 12 slices, namely, Slice-1 through Slice-12, are indicated, however, more or fewer slices may be employed in other embodiments.

Figures 3A, 3B:
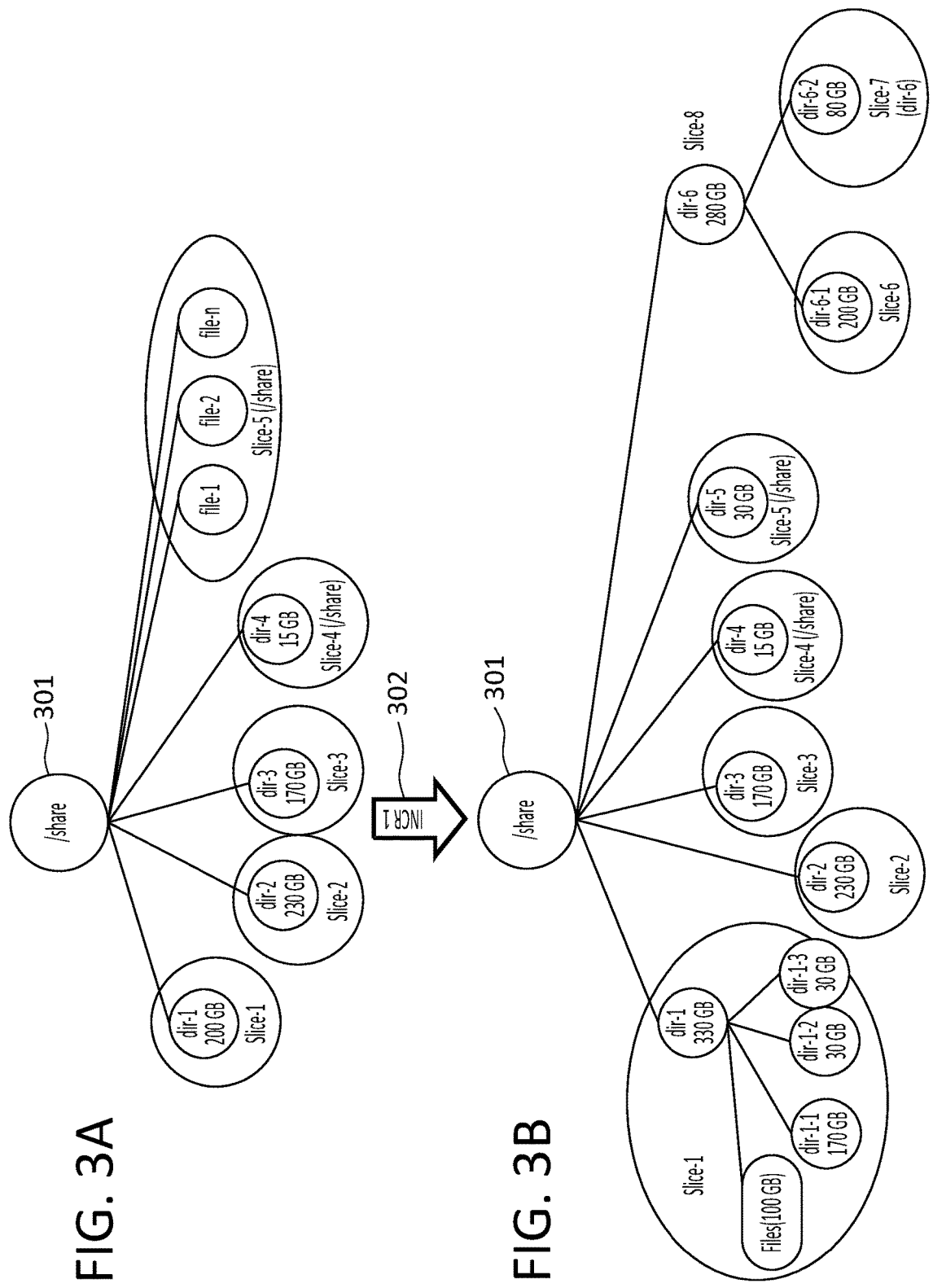

As shown in FIG. 3a, a share 301, such as an NAS share, is shown that includes three slices, namely, Slice-1, Slice-2, and Slice-3, that respectively include a directory dir-1, dir-2, and dir-3. As further indicated, a Slice-4 may include a directory dir-4 which may include 'leftover' files that cannot be added to the other slices, possibly because the data in those files is independent of the directories and files in the other slices and, as such, cannot be consolidated into any of those other slices.

Note that while dir-4 is indicated as being contained in a Slice-4, an actual Slice-4 may not exist, and dir-4 may be directly in the share 301, and not included in a slice of the share 301. Thus, the notation 'Slice-4,' in this example, may simply be used as a convenient way to refer to dir-4, and the fact that dir-4 is not included in any other slices. Similarly, while file-1, file-2, and file-3, are indicated as being included in a 'Slice-5,' the Slice-5 may not actually exist, and those files may be directly in the share 301, and not in a slice of the share 301.

Various processes may be performed concerning the data embraced by the share 301. For example, the slices of the share 301 may be backed up, such as by way of an incremental backup process, and/or new/modified data may be added to a share, and data may be deleted from a share. These various possible operations are collectively denoted at 302. As a result of performance of operations such as these, the share 301 may be modified to accommodate any data changes resulting from such operations. The modified share 301 is shown in FIG. 3b.

As shown in FIG. 3b, the size of dir-1 has grown from 200 GB to 330 GB, with the data of dir-1 apportioned, within Slice-1, into the 3 sub-directories dir-1-1, dir-1-2, and dir-1-3, as well as a group of files totaling 100 GB. No changes have been made to Slices 2-4, and Slice-5 now includes a directory dir-5 that includes file-1, file-2, and file-3. In the example of FIG. 3b, and as noted earlier, 'Slice-5' may not actually exist, and dir-5 may reside directly in the share 301, and not in a slice. Finally, a new directory dir-8 of 280 GB has been added to the share 301, which may reside directly in the share 301 but is designated as being in a 'Slice-8.' That is, the Slice-8 may simply be a placeholder share that does not include any files. The dir-6 may be split into two slices, namely, Slice-6 and Slice-7, as shown, that respectively include dir-6-1, and dir-6-2.

Further changes and operations, 304, involving data within the share 301 result in the share 301 configuration shown in FIG. 3c. As shown there, dir-1 has been used to define three slices, such that previous Slice-1 (FIG. 3b) has been sliced to define three slices, namely, an updated version of Slice-1 (100 GB of files), Slice-2 (files of dir-1-1), and Slice-3 (files of dir-1-2 and dir-1-3). That is, the 330 GB of Slice-1 (FIG. 3b) have been split to create three new slices, as shown in FIG. 3c.

Note that, in general, slice names, such as 'Slice-1' for example, may be reassigned to new slices, that is, slices may be re-designated with new names, as the result of changes and operations involving the data in a share. Thus, neither slice names nor slice configurations are necessarily static. It is partly for this reason that new slice lists may be generated after a set of slice-related operations have been completed. By way of illustration, and with continued attention to FIG. 3c, relative to FIG. 3a, and by way of illustration, Slice-3 (dir-3) has been redesignated as Slice-5, and Slice-2 (dir-2) has been redesignated Slice-4 (dir-2). Various other slices have been redesignated as well, as apparent from a comparison of FIGS. 3b and 3c.

Notably, Slice-4 (dir-4) and Slice-5 (dir-5) have been consolidated into Slice-6 (dir-4, and dir-5), as shown in FIG. 3c. Further, while Slice-6 and Slice-7 (FIG. 3b) have been respectively redesignated Slice-7 and Slice-8 (FIG. 3c), the respective contents of those slices have not changed.

Turning finally to FIG. 3d, still further changes and operations, 306, involving data within the share 301 result in the share 301 configuration shown in FIG. 3d. As shown there, Slice-6 has been re-sliced so that dir-5 is now in Slice-11, rather than in Slice-6. Slice-6 may remain as a share slice that includes dir-4, as before.

Thus, as collectively disclosed by FIGS. 3a-3d, various slices have been added, re-sliced, and consolidated. Note that the example operations in those Figures are indicated as being performed based on data size thresholds. As disclosed herein, such operations may additionally, or alternatively, be performed based on the respective file counts of the slices.
D.2 FIGS. 4a-4e In terms of their general disclosure of slice-related operations such as adding new slices, re-slicing existing slices, and consolidating multiple slices, the examples in FIGS. 4a-4e may be similar to the examples of FIGS. 3a-3d. Thus, the following discussion addresses only selected slice-related operations of FIGS. 4a-4e. In the examples of FIGS. 4a-4e, 12 slices, namely, Slice-1 through Slice-13, are indicated, however, more or fewer slices may be employed in other embodiments.

Figures 4A, 4B:
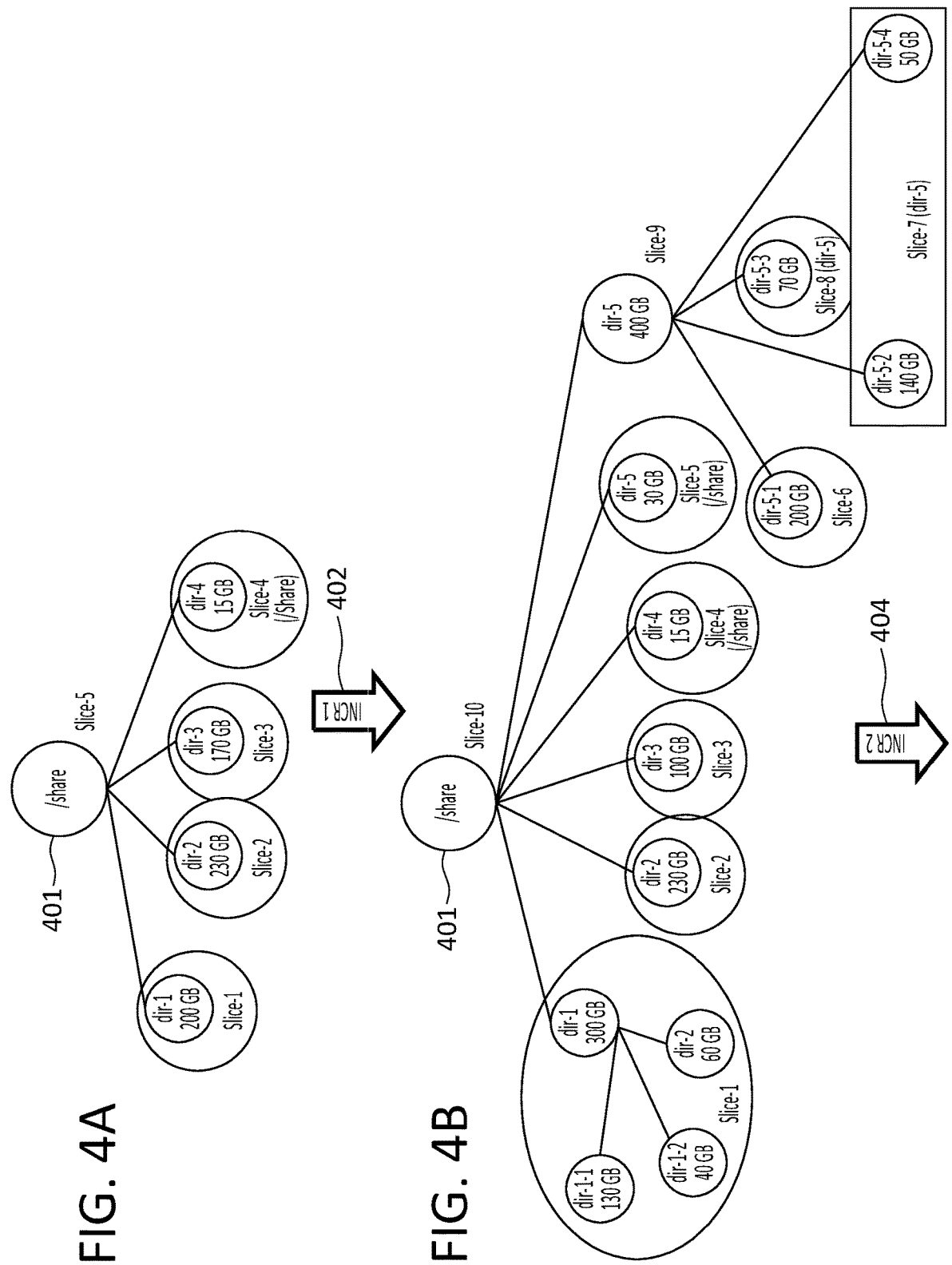

As shown in FIG. 4a, the share 401 initially includes four slices, Slice-1, Slice-2, Slice-3, and Slice-4. Slice-4 is a share slice and, as such, may not be an actual slice but simply a designator, or empty placeholder, for dir-4 which resides directly in the share 401 and not in a slice.

Various processes may be performed concerning the data embraced by the share 401. For example, the slices of the share 401 may be backed up, such as by way of an incremental backup process, and/or new/modified data may be added to a share, and data may be deleted from a share. These various possible operations are collectively denoted at 402. As a result of performance of operations such as these, the share 401 may be modified to accommodate any data changes resulting from such operations. The modified share 401 is shown in FIG. 4b.

Particularly, it can be seen in FIG. 4b that dir-1 has grown in size from 200 GB to 300 GB, and split into a total of three sub-directories, all included in Slice-1. As well, FIG. 4b indicates that new slices Slice5-Slice9 have been added. Slice7, in particular, results from a re-slice of Slice9, and consolidates dir-5-2 and dir-5-4. Dir-5-1 and dir-5-3 are respectively include in Slice-6 and Slice-8. Note that in FIG. 4b, the a new directory dir-5 has been added, and then sliced to form Slice-6, Slice-7, and Slice-8.

Figure 4C:
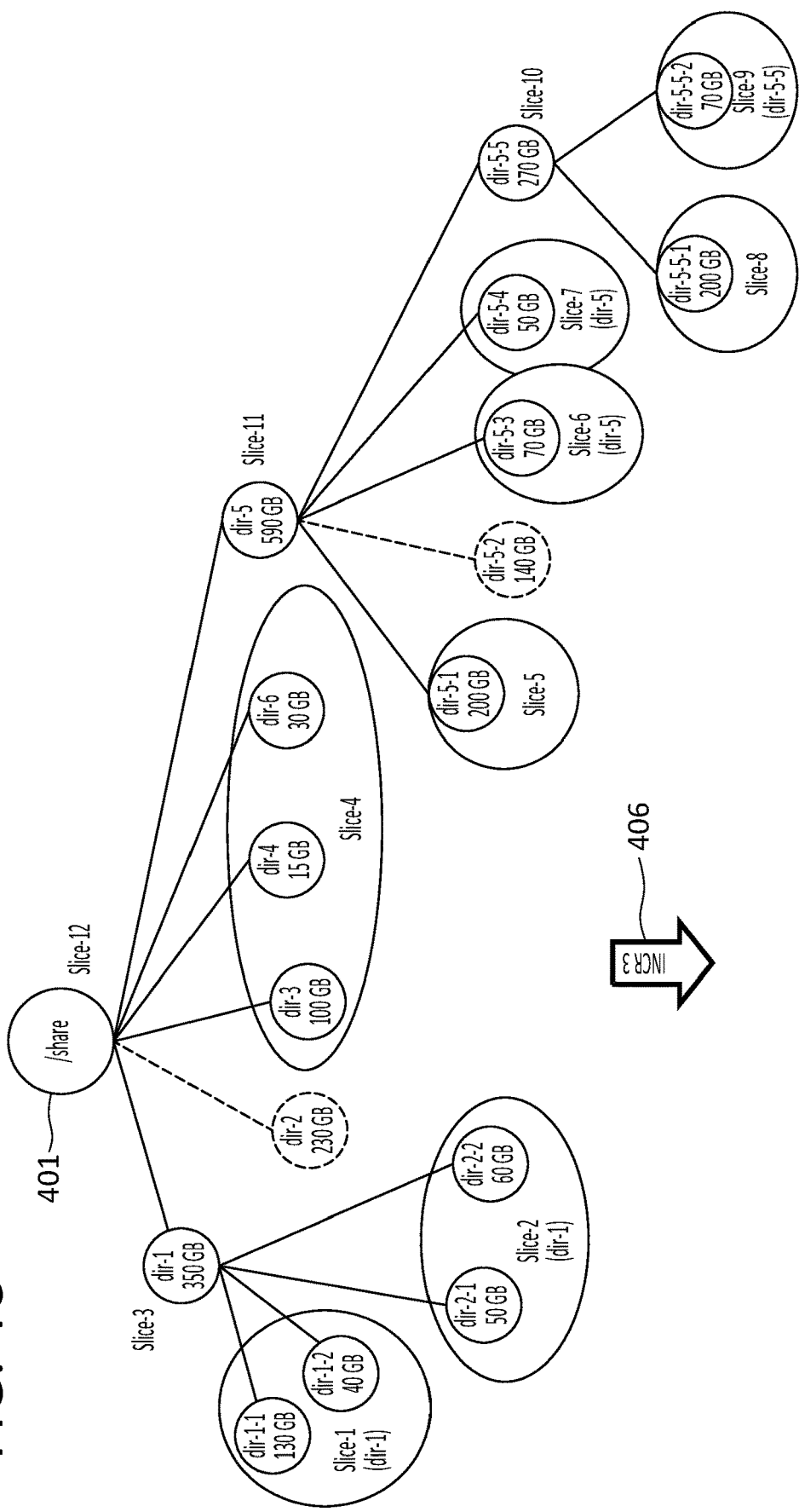

Turning next to FIG. 4c, after various operations 404, which may include the operations denoted at 402, have been performed, the share 401 may have the configuration shown in FIG. 4c. For example, Slice-1 (dir-1, see FIG. 4b) may be re-sliced to define a new Slice-1 (dir-1-1 and dir-1-2) and Slice-2 (dir-2-1 and dir-2-2). As result of this re-slicing, the 300 GB of dir-1 is now distributed across Slice-1 and Slice-2. FIG. 4c also indicates that Slice-3 (dir-3), Slice-4 (dir-4), and Slice-5 (dir-5), see FIG. 4a), have now been consolidated in a new Slice-4 (FIG. 4c). Finally, dir-5 (400 GB) has been split up to define various new/modified slices Slice-5 through Slice-10. Note that because Slice-10 is 270 GB, and thus exceeds a possible 200 GB threshold, Slice-10 has been re-sliced to define Slice-8 and Slice-9, both of which are 200 GB or less.

Figure 4D:
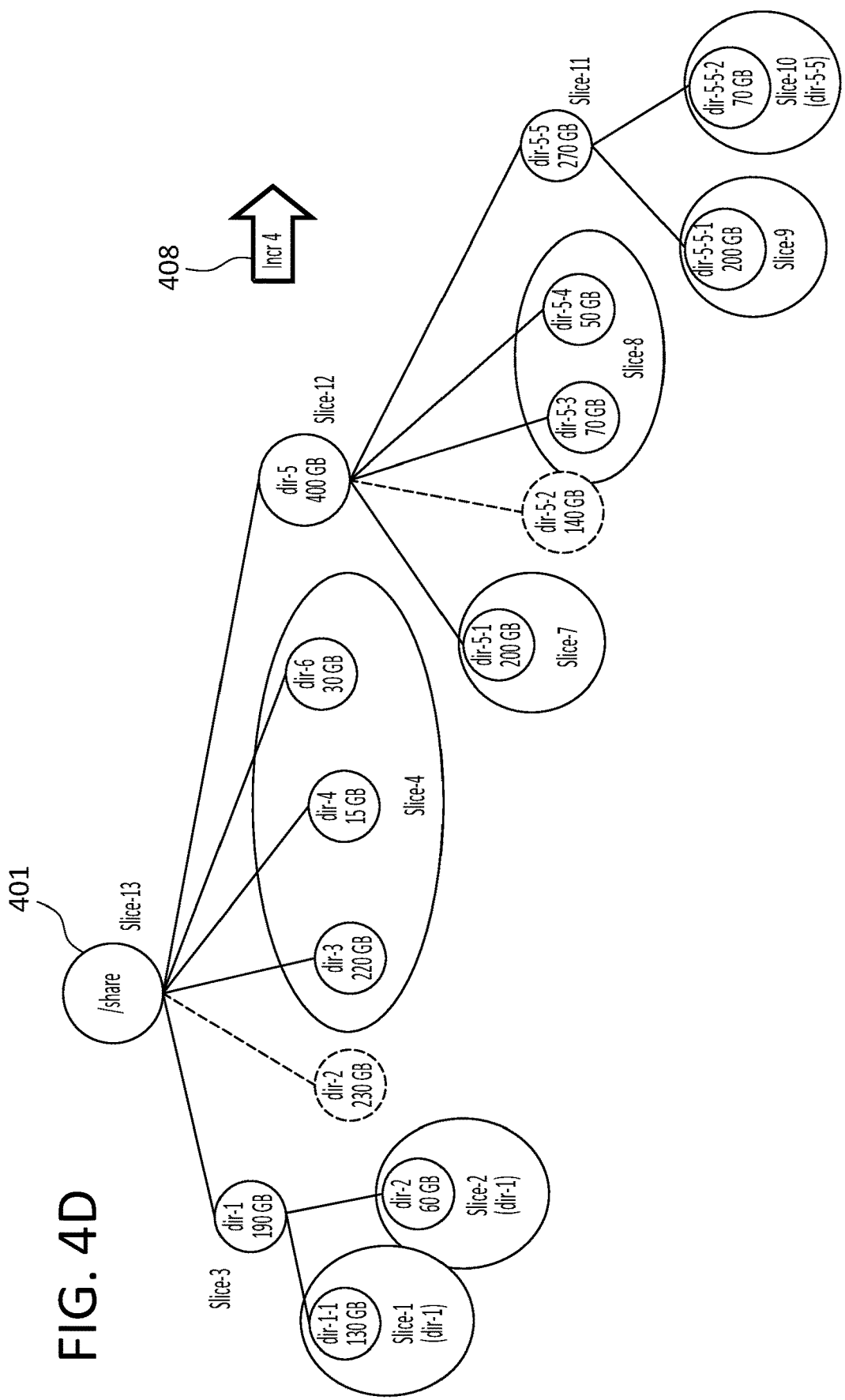

With reference now to FIG. 4d, and possibly as a result of one or more changes and operations 406, which may include changes and operations such as the changes and operations 402, the share 401 may take the configuration illustrated there. As shown, dir-1 has decreased in size from 350 GB (FIG. 4c) to 190 GB (FIG. 4d) and, as a result, Slice-1 and Slice-2 each now have less data. Further, Slice-6 and Slice-7 (FIG. 4c) have now been consolidated into Slice-8 (FIG. 4d).

Figures 5A, 5B, 5C:
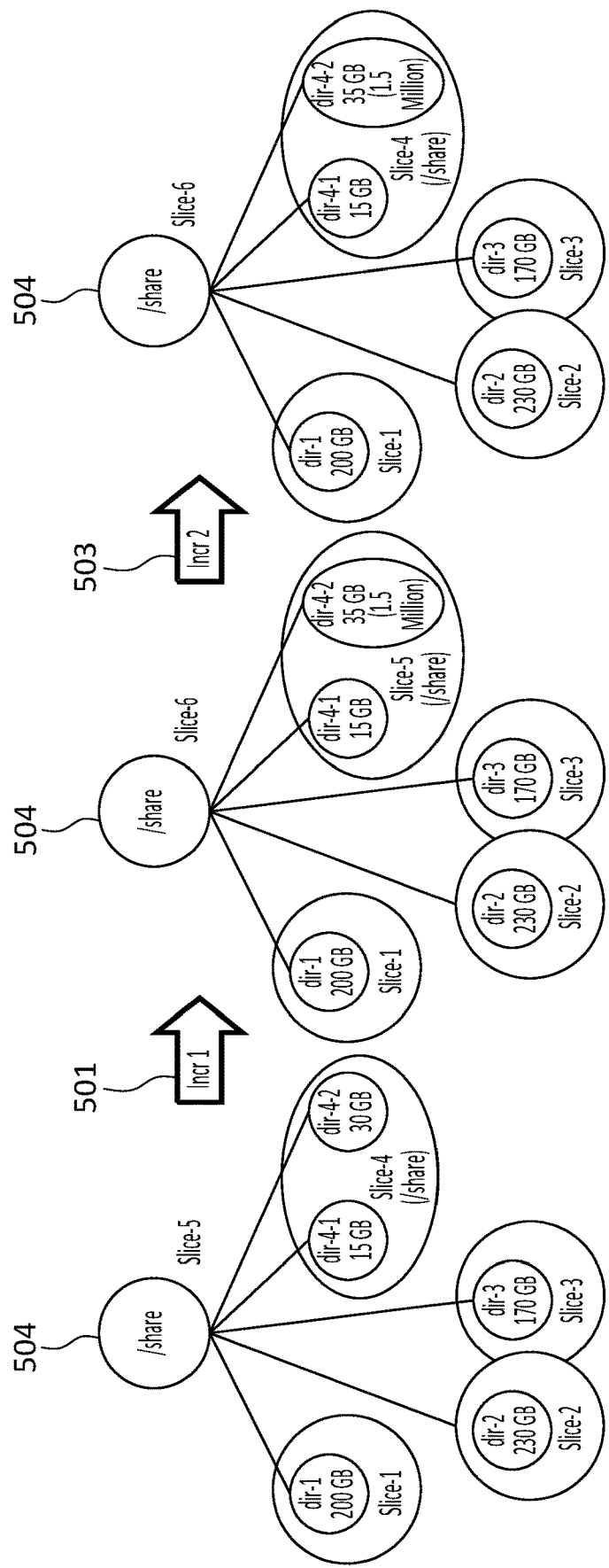
FIGS. 5a-5c disclose example processes involving slices based on file counts.
Figures 6A, 6B, 6C:
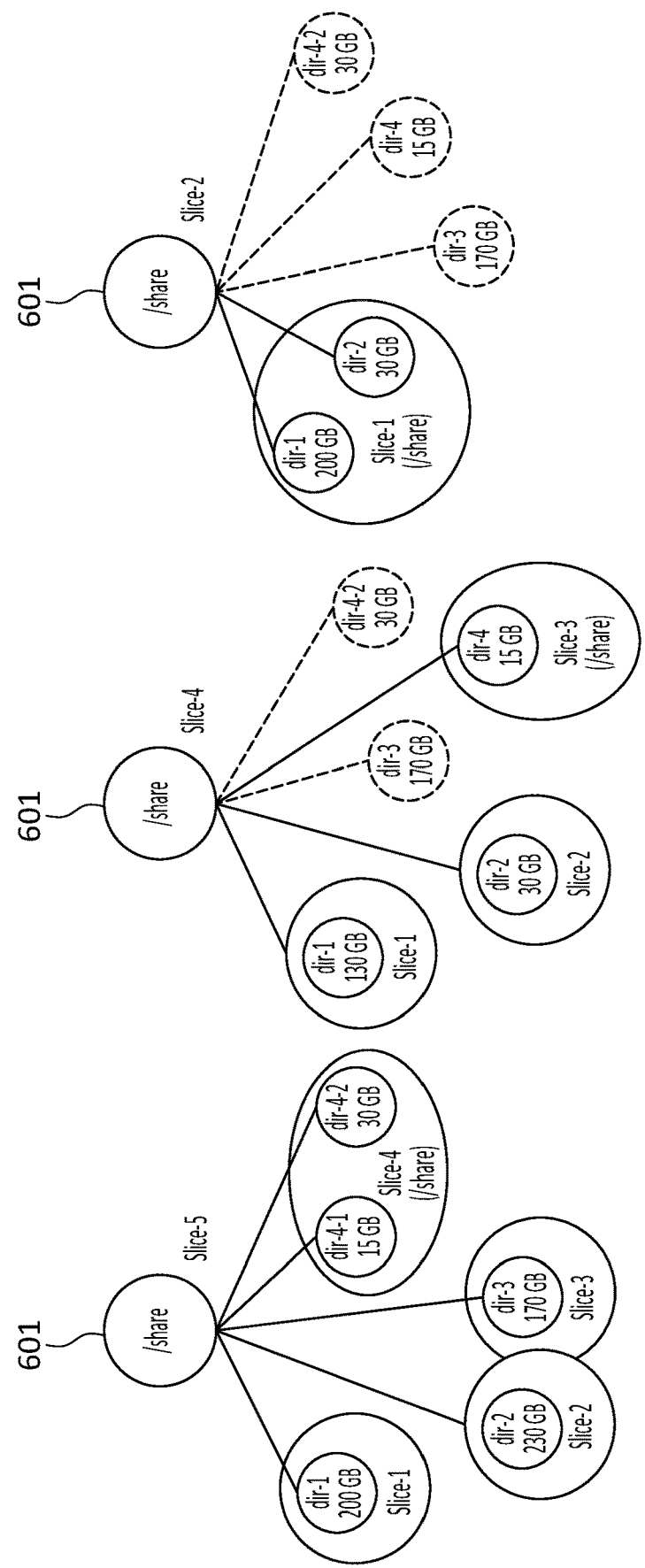
FIGS. 6a-6c disclose example processes involving changes to slices resulting from directory deletions.

Again, possibly as a result of one or more changes and operations 408, which may include changes and operations such as the changes and operations 402, the share 401 may take the configuration illustrated in FIG. 4e. In that Figure, Slice-4 has been re-sliced so that dir-3, formerly in Slice-4 (FIG. 4d), is now in Slice-3. As collectively shown in FIGS. 4e and 4f, an operation 410 such as a backup for example, may consolidate all of the share 401 into a single Slice-1.
D.3 FIGS. 5a-5c As noted herein, slice operations, such as slice addition, slice consolidation, and re-slicing, may be implemented based in whole, or in part, on file counts. An example of this is indicated in FIGS. 5a-5c where the number of files increases as shown at 501 and 503. Thus, given the initial configuration of a share 504 in FIG. 5a, the addition 501 of files to the share 504 may result in the share 504 configuration of FIG. 5b. As shown, dir-4-2 has increased in size from 30 GB to 35 GB (1.5 million files). Further, Slice-5 of FIG. 5a has been redesignated as Slice-4 in FIG. 5c. Because the number of files in Slice-4 may be at, or below, a threshold, such as 2 million files for example, no other changes to the share 504 may be needed. Note that in the examples of FIGS. 5a-5c, 6 slices, namely, Slice-1 through Slice-6, are indicated, however, more or fewer slices may be employed in other embodiments.
D.4 FIGS. 6a-6c Slice-related operations, such as slice consolidation for example, may result from the addition and/or deletion of directories. FIGS. 6a-6c disclose changes to an example share 601 resulting from the deletion of one or more directories from the share 601. The initial configuration of the share 601, before any directory changes are implemented in shown in FIG. 6*a*. In FIG. 6*b*, dir-3 and dir-4-2 have been deleted from the initial configuration of the share 601. As a result, the number of slices has been reduced from 4 to 3. Additional deletions from the share 601 of FIG. 6*b* result in the configuration shown in FIG. 6*c*. Particularly, the share 601 in FIG. 6*c* has only a single slice, namely, Slice-1. Further, Slice-1 is a consolidation of former Slice-1 and Slice-2. Note that in the examples of FIGS. 6*a*-6*c*, 5 slices, namely, Slice-1 through Slice-5, are indicated, however, more or fewer slices may be employed in other embodiments.

E. Periodic Full Behavior

If customer configures NAS shares PLC to have periodic full backups, such as every month for example, then slicing may be implemented, possibly automatically, as disclosed herein. The slicing, when performed, may be based on file counts and/or data amounts, in a share. Though, with the periodic full backup approach, a customer may see a relatively long backup window for full backup, new slices will still be created, and backups may be optimized further.

Note that there may be consolidation and reorganization challenges with re-slicing. For example, an important consideration during some re-slicing operations is the handling of slices which are reduced in size on account of ongoing changes by the end-users. Not handling these slices may result in problems, such as: (1) losing out on operational efficiencies of slice distribution across different proxy nodes; and (2) container explosion, that is, a proliferation of containers, such as CDSF containers, on the storage platform with respect to each iteration of the NAS asset backup.

Figure 7A:
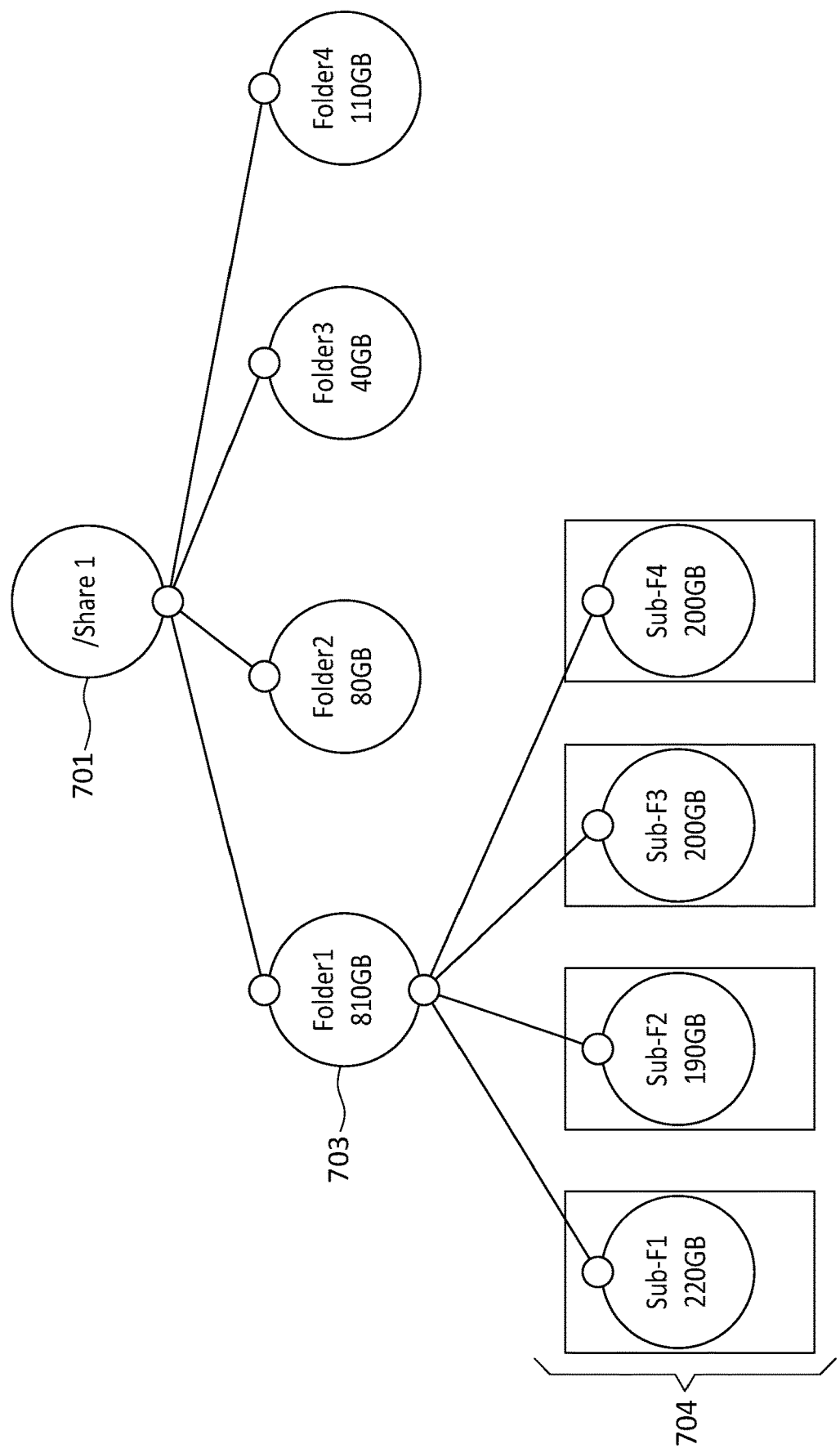
FIGS. 7a-7b disclose aspects of an example slice consolidation process.
Figure 7B:
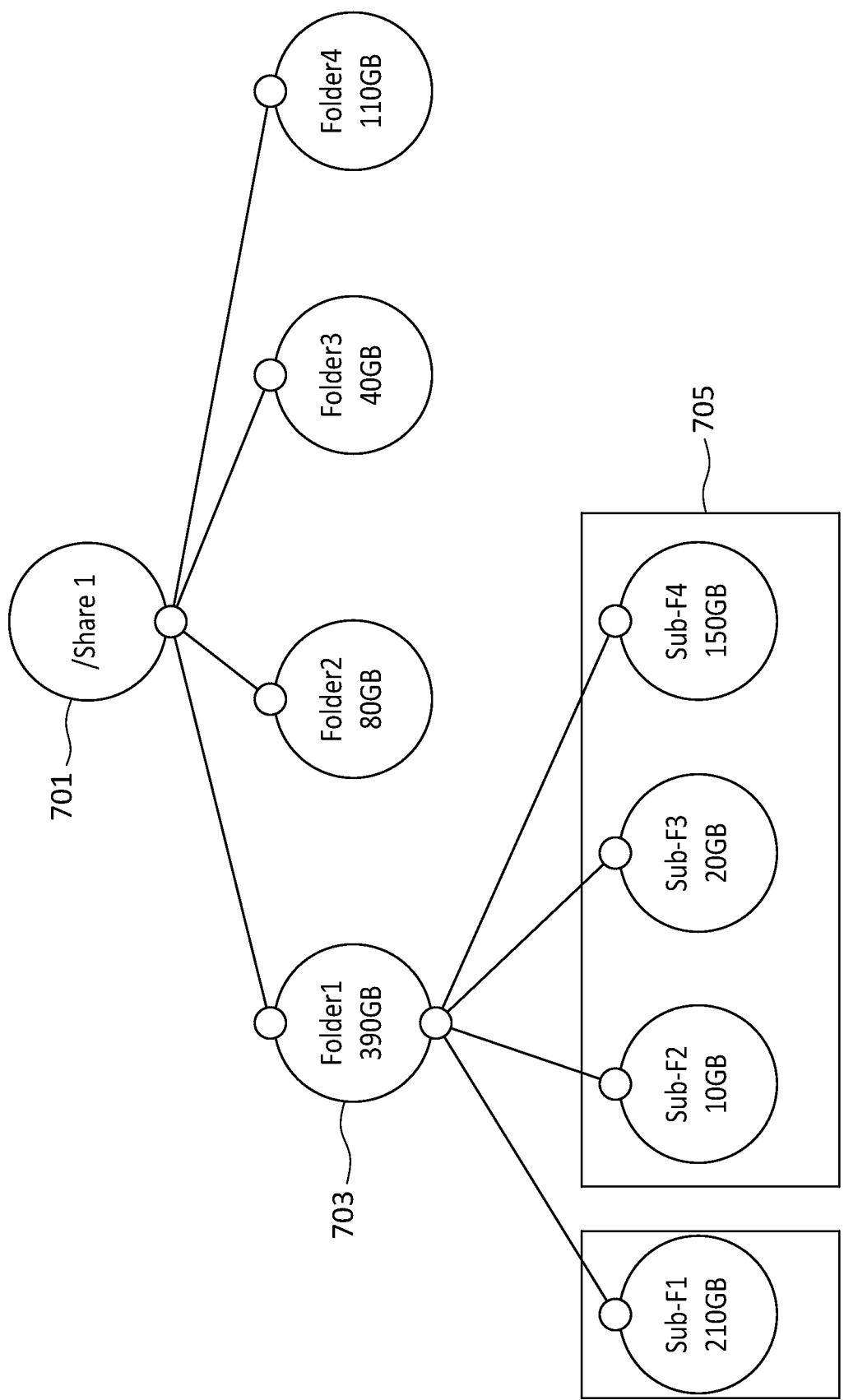

Consider, for example, the case illustrated in FIG. 7*a* where a share 701 includes four slices 702, one of which has a folder 703 with 4 slices 704 for an incremental backup. As shown, the corresponding SSIDs for the slices are <SSID-Sub-F1>, <SSID-Sub-F2>, <SSID-Sub-F3> and <SSID-Sub-F4>. Suppose that, before the next backup, the sizes of the first 2 slices decrease considerably, necessitating a consolidation for optimal slice size. Post consolidation, the first 2 slices, namely, <SSID-Sub-F1>, <SSID-Sub-F2>, may be merged into a single slice 705 as shown in FIG. 7*b*.

Now as part of a synthesized backup, in which the data changes are synthesized together with a full backup copy, embodiments may employ the previous backup details for performing synthesis operations. In this illustrative example, there is a many-to-one mapping between the previous backups and the current backup iteration, and the filesystem backup may need to refer to 2 previous backups as part of single current backup asset.

With regard to the options discussed below, it is noted that re-slicing may be performed within an existing slice. That is, these example implementations may not take into account consolidation of smaller slices from across multiple previous backup slices. These example implementations may employ a single SSID from its constituents.

In particular, these implementations may take the form of a middle, or hybrid, approach which performs incremental backup for some data in a consolidated slice, and full backup for the remaining data in that consolidated slice. For example, in case of consolidation, the merged container can be associated with either <SSID-Sub-F1> or <SSID-Sub-F2>. In such cases, the data corresponding to the associated SSID may undergo an incremental backup, whereas the other part of the data in the consolidated slice goes in for a full backup. This approach may address, and resolve, challenges associated with performing a full backup on the entire consolidated slice. Note that this approach may require changes in the slicing algorithm for the previous SSID association mechanism.

F. Further Discussion

Various implementation considerations may apply to some embodiments. Such considerations may include, for example: (1) moderate complexity in implementation; (2) constituent individual slices may need to be identified for a consolidated slice; (3) no changes may be needed on the filesystem agent side; and, (4) the backup window increase may be moderate, since only some slices go in for a full backup and the backup window increase is inversely proportional to the number of such slices.

Example embodiments may address, and resolve, one or more known problems. Such problems include, but are not limited to: known storage platforms, such as the PowerProtect DD System, do not have any volume or share slicing algorithm; there are no known methods to re-slice and re-balance slices; and, since filesystem data a non linear and can be randomly distributed, and the addition and deletion of new data can occur at any place, and known approaches are not well suited to deal with such circumstances.

Further to the foregoing points, example embodiments may provide various useful features and advantages. For example, embodiments may provide the ability to manage the addition/deletion of new data while achieving forever incremental operation by balancing the slices. Thus, if one slice grows bigger, the re-slicing algorithm makes sure to bring the slices to its threshold level, whether measured by total file count and/or the size of the slice. Further, when data gets deleted, one slice can reduce to its size threshold or file-count threshold. As to this, the disclosed algorithms may find such slices and, if the slices are in the same level of the share, the slices may be merged together into a single slice. As another example, embodiments may operate to re-slice and consolidate, in place, a balanced NAS data protection that may be achieved in a forever incremental manner. Finally, example embodiments of a slicing algorithm may make use of the existing CDSF container from a previous backup in case of re-slicing, or a bigger CDSF container among the participating consolidated slices, to make a faster synthesizing.

G. Example Methods

It is noted with respect to the disclosed methods, including the example method of FIG. 2, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

H. Further Example Embodiments

Following are some further example embodiments of the invention. These are presented only by way of example and are not intended to limit the scope of the invention in any way.

Embodiment 1. A method, comprising: in a network attached storage platform: determining a size of a slice of data that is included in a share of the network attached storage platform; when the size of the slice exceeds a threshold, re-slicing the slice to generate multiple new slices, and each of the new slices has a size that is smaller than the threshold; and when all slices in the share have been evaluated in terms of their respective sizes, generating a slice list that includes the new slices.

Embodiment 2. The method as recited in embodiment 1, wherein the threshold is expressed in terms of a file count for the slice.

Embodiment 3. The method as recited in any of embodiments 1-2, wherein the threshold is expressed in terms of an amount of data in the slice.

Embodiment 4. The method as recited in any of embodiments 1-3, further comprising backing up each of the slices in the slice list.

Embodiment 5. The method as recited in embodiment 4, wherein each slice is backed up with a respective backup stream.

Embodiment 6. The method as recited in any of embodiments 1-5, wherein, when data has been removed from another slice, the method further comprises consolidating the another slice with a further slice to produce a consolidate slice whose size is below the threshold.

Embodiment 7. The method as recited in embodiment 6, wherein after the consolidating, a total number of slices in the share is less than it was prior to the consolidating.

Embodiment 8. The method as recited in any of embodiments 1-7, wherein the re-slicing operation is performed automatically in response to an outcome of the determining operation.

Embodiment 9. The method as recited in any of embodiments 1-8, further comprising adding a new directory to the slice, and automatically generating one or more additional slices that collectively include all data in the new directory.

Embodiment 10. The method as recited in any of embodiments 1-9, further comprising periodically performing a full backup of the share.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 8:
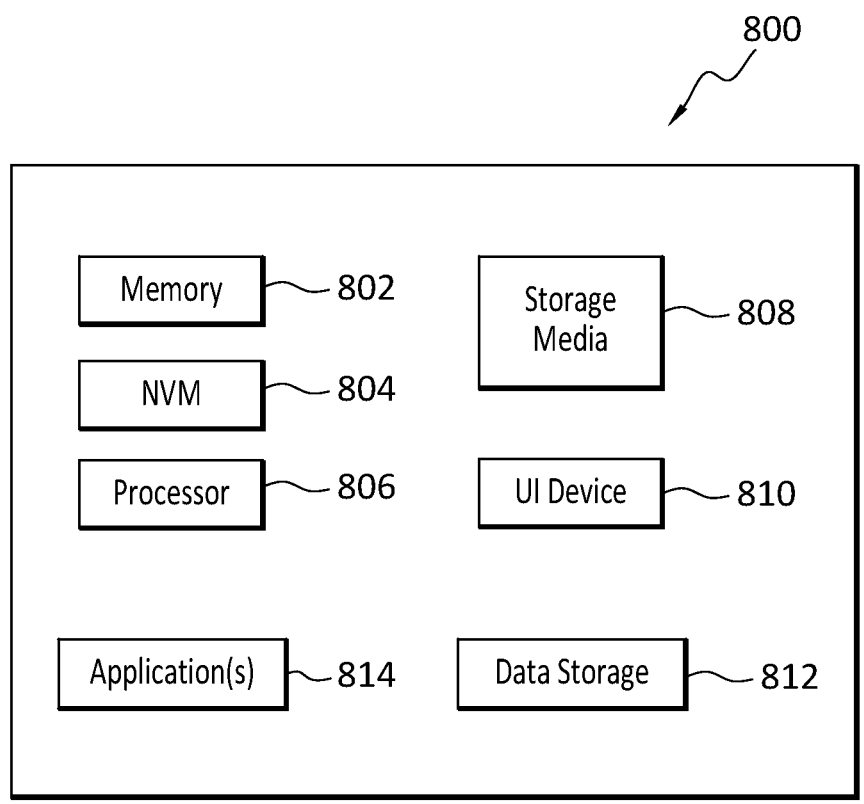
FIG. 8 discloses an example computing entity operable to perform any of the claimed methods, processes, and operations.

With reference briefly now to FIG. 8, any one or more of the entities disclosed, or implied, by FIGS. 1-7b and/or elsewhere herein, may take the form of, or include, or be implemented on, or hosted by, a physical computing device, one example of which is denoted at 800. As well, where any of the aforementioned elements comprise or consist of a virtual machine (VM), that VM may constitute a virtualization of any combination of the physical components disclosed in FIG. 8.

In the example of FIG. 8, the physical computing device 800 includes a memory 802 which may include one, some, or all, of random access memory (RAM), non-volatile memory (NVM) 804 such as NVRAM for example, read-only memory (ROM), and persistent memory, one or more hardware processors 806, non-transitory storage media 808, UI (user interface) device 810, and data storage 812. One or more of the memory components 802 of the physical computing device 800 may take the form of solid state device (SSD) storage. As well, one or more applications 814 may be provided that comprise instructions executable by one or more hardware processors 806 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method for protecting data in a network attached storage (NAS) platform, of which a share includes slices of data, where each of the slices is usable to create a respective incremental backup of a dataset, said method being further for grouping the data in the NAS platform in a manner to facilitate parallel stream backups of the data, said method comprising:
    accessing the share of the NAS platform, wherein the NAS platform is associated with a backup platform that is configured to use multiple parallel streams to back up the slices of data of the share;
    determining a first size of a first slice of data that is included in the share of the NAS platform;
    determining a second size of a second slice of data that is included in the share of the NAS platform;
    determining that the first size of the first slice exceeds a threshold;
    determining that the second size of the second slice does not exceed the threshold;
    in response to determining that the first size of the first slice exceeds the threshold, re-slicing the first slice to generate new slices, wherein each of the new slices has a corresponding size that is smaller than the threshold, and wherein re-slicing the first slice to generate the new slices is performed using a scaling and performance consideration in which a backup efficiency by which the share was previously backed up is caused to be at least maintained after the first slice is re-sliced based on how the first slice is re-sliced;
    in response to determining that the second size of the second slice does not exceed the threshold, determining that a re-slicing operation will not be performed on the second slice, such that re-slicing is performed for a limited number of the slices of the share and is not performed for all the slices of the share during said re-slicing; and
    generating a slice list that includes the new slices,
    wherein:
        the slices of the share include one slice which includes leftover files that are independent of directories and files in any other slices and cannot be consolidated into any other slices, and
        one of the slices is not an actual slice and resides directly in the share.

2. The method as recited in claim 1, wherein the threshold is expressed in terms of a file count for the first slice.

3. The method as recited in claim 1, wherein the threshold is expressed in terms of an amount of data in the first slice.

4. The method as recited in claim 1, further comprising backing up each of the slices in the slice list.

5. The method as recited in claim 4, wherein each slice is backed up with a respective backup stream.

6. The method as recited in claim 1, wherein, when data has been removed from another slice, the method further comprises consolidating the another slice with a further slice to produce a consolidate slice whose size is below the threshold.

7. The method as recited in claim 1, wherein the re-slicing operation is performed automatically in response to determining that the first size exceeds the threshold.

8. The method as recited in claim 1, further comprising adding a new directory to the first slice, and automatically generating one or more additional slices that collectively include all data in the new directory.

9. The method as recited in claim 1, further comprising periodically performing a full backup of the share.

10. A non-transitory storage medium having stored therein instructions that are executable by one or more hardware processors to cause the one or more hardware processors to protect data in a network attached storage (NAS) platform, of which a share includes slices of data, where each of the slices is usable to create a respective incremental backup of a dataset and to further cause the one or more hardware processors to group the data in the NAS platform in a manner to facilitate parallel stream backups of the data, the instructions being configured to cause the one or more hardware processors to:
    access the share of the NAS platform, wherein the NAS platform is associated with a backup platform that is configured to use multiple parallel streams to back up the slices of data of the share;
    determine a first size of a first slice of data that is included in the share of the NAS platform;
    determine a second size of a second slice of data that is included in the share of the NAS platform;
    determine that the first size of the first slice exceeds a threshold;
    determine that the second size of the second slice does not exceed the threshold;

in response to determining that the first size of the first slice exceeds the threshold, re-slicing the first slice to generate new slices, wherein each of the new slices has a corresponding size that is smaller than the threshold, and wherein re-slicing the first slice to generate the new slices is performed using a scaling and performance consideration in which a backup efficiency by which the share was previously backed up is caused to be at least maintained after the first slice is re-sliced based on how the first slice is re-sliced;

in response to determining that the second size of the second slice does not exceed the threshold, determine that a re-slicing operation will not be performed on the second slice, such that re-slicing is performed for a limited number of the slices of the share and is not performed for all the slices of the share during said re-slicing; and generate a slice list that includes the new slices, wherein:

the slices of the share include one slice which includes leftover files that are independent of directories and files in any other slices and cannot be consolidated into any other slices, and one of the slices is not an actual slice and resides directly in the share.

11. The non-transitory storage medium as recited in claim 10, wherein the threshold is expressed in terms of a file count for the first slice.

12. The non-transitory storage medium as recited in claim 10, wherein the threshold is expressed in terms of an amount of data in the first slice.

13. The non-transitory storage medium as recited in claim 10, wherein the operations further comprise backing up each of the slices in the slice list.

14. The non-transitory storage medium as recited in claim 13, wherein each slice is backed up with a respective backup stream.

15. The non-transitory storage medium as recited in claim 10, wherein, when data has been removed from another slice, the one or more hardware processors consolidate the another slice with a further slice to produce a consolidate slice whose size is below the threshold.

16. The non-transitory storage medium as recited in claim 15, wherein after the consolidating, a total number of slices in the share is less than it was prior to the consolidating.

17. The non-transitory storage medium as recited in claim 10, wherein the re-slicing operation is performed automatically in response to determining that the first size exceeds the threshold.

18. The non-transitory storage medium as recited in claim 10, wherein the operations further comprise adding a new directory to the first slice, and automatically generating one or more additional slices that collectively include all data in the new directory.

19. The non-transitory storage medium as recited in claim 10, wherein the operations further comprise periodically performing a full backup of the share.

* * * * *